US011533441B2

(12) United States Patent
Edwards et al.

(10) Patent No.: US 11,533,441 B2
(45) Date of Patent: Dec. 20, 2022

(54) SYSTEMS AND METHODS FOR THREE-HUNDRED SIXTY DEGREE INSPECTION OF AN OBJECT

(71) Applicant: The Steelastic Company, LLC, Cuyahoga Falls, OH (US)

(72) Inventors: Frank Alan Edwards, Uniontown, OH (US); Daniel Duane Hawk, Akron, OH (US); Robert Thomas Irwin, Hartville, OH (US); A. Jack Papes, Coventry Township, OH (US)

(73) Assignee: THE STEELASTIC COMPANY, LLC, Cuyahoga Falls, OH (US)

( * ) Notice: Subject to any disclaimer, the term of this patent is extended or adjusted under 35 U.S.C. 154(b) by 35 days.

(21) Appl. No.: 17/162,301

(22) Filed: Jan. 29, 2021

(65) Prior Publication Data
US 2021/0250520 A1 Aug. 12, 2021

Related U.S. Application Data

(60) Provisional application No. 62/970,904, filed on Feb. 6, 2020.

(51) Int. Cl.
H04N 5/247 (2006.01)
H04N 5/232 (2006.01)
(Continued)

(52) U.S. Cl.
CPC ......... H04N 5/247 (2013.01); G01N 21/8851 (2013.01); G01N 21/952 (2013.01);
(Continued)

(58) Field of Classification Search
CPC ............... H04N 5/247; H04N 5/23299; G01N 21/8851; G01N 21/9515; G01N 21/952; G05B 2219/32197; G05B 2219/45063
See application file for complete search history.

(56) References Cited

U.S. PATENT DOCUMENTS 5,735,995 A 4/1998 Bull et al.
6,124,925 A * 9/2000 Kaneko ............... G01M 17/027
356/394
(Continued)

FOREIGN PATENT DOCUMENTS

CN 103687718 A * 3/2014 ......... B29D 30/0061
CN 103901053 A * 7/2014 ........... G01N 23/185
(Continued)

OTHER PUBLICATIONS

Copy of International Search Report and Written Opinion from international application No. PCT/US2021/015272, dated May 7, 2021, 12pp.

Primary Examiner — Michael Robert Cammarata
(74) Attorney, Agent, or Firm — Crowell & Moring LLP

(57) ABSTRACT

In one embodiment, a system for inspecting an object comprises a first camera for inspecting a first surface of the object, and a second camera for inspecting a second surface of the object. The object may be placed upon a support structure during simultaneous inspection by the first camera and the second camera. At least one roller is arranged to selectively engage the object when the object is placed upon the support structure, wherein the at least one roller is adapted for circumferential rotation relative to the support structure. Rotation of the at least one roller causes a corresponding circumferential rotation of the object relative to the first and second cameras.

19 Claims, 6 Drawing Sheets

(51) Int. Cl.
*G01N 21/88* (2006.01)
*G01N 21/95* (2006.01)
*G01N 21/952* (2006.01)

(52) U.S. Cl.
CPC ..... *G01N 21/9515* (2013.01); *H04N 5/23299* (2018.08); *G05B 2219/32197* (2013.01); *G05B 2219/45063* (2013.01)

(56) References Cited

U.S. PATENT DOCUMENTS

| | | | | |
|---|---|---|---|---|
| 6,840,097 | B1 * | 1/2005 | Huber | G01M 17/028 73/152.01 |
| 7,909,078 | B2 * | 3/2011 | Burg | B29D 30/0061 156/394.1 |
| 8,939,486 | B2 * | 1/2015 | Gorham | B25J 15/10 294/93 |
| 9,384,541 | B2 | 7/2016 | Yoshimatsu et al. | |
| 2013/0174657 | A1 * | 7/2013 | Beccavin | G01M 17/02 73/146 |
| 2014/0265400 | A1 * | 9/2014 | Gorham | B25J 15/10 294/93 |
| 2015/0022634 | A1 * | 1/2015 | Perez | G01N 21/898 348/46 |
| 2016/0144398 | A1 * | 5/2016 | Russo, II | B29D 30/48 427/256 |
| 2017/0234677 | A1 * | 8/2017 | Little | G01M 17/02 348/86 |
| 2017/0370807 | A1 * | 12/2017 | Boffa | G01M 17/027 |
| 2019/0107385 | A1 * | 4/2019 | Razy | G01M 17/027 |
| 2019/0283351 | A1 * | 9/2019 | Vaniglia | B29D 30/0061 |
| 2020/0047569 | A1 * | 2/2020 | De Stasio | B29D 30/0633 |
| 2020/0400590 | A1 * | 12/2020 | Boffa | H04N 13/156 |
| 2021/0250520 | A1 * | 8/2021 | Edwards | G01N 21/95 |

FOREIGN PATENT DOCUMENTS

| | | | | |
|---|---|---|---|---|
| CN | 105408733 A | * | 3/2016 | ........ B60C 25/005 |
| CN | 105579825 A | * | 5/2016 | ........ G01M 17/021 |
| CN | 109073511 A | * | 12/2018 | ........ G01M 17/022 |
| EP | 3050496 B1 | * | 4/2022 | ........ A61B 3/0025 |
| JP | S52 78283 A | | 7/1977 | |
| JP | S63 165707 A | | 7/1988 | |
| JP | 06201595 A | * | 7/1994 | |
| JP | H06 201595 A | | 7/1994 | |
| JP | H09 304288 A | | 11/1997 | |
| JP | H09304288 | * | 11/1997 | |
| JP | 2007076289 A | * | 3/2007 | |
| JP | 3949796 B2 | * | 7/2007 | ........ B29D 30/0061 |
| JP | 2010 145374 A | | 7/2010 | |
| JP | 2012 225847 A | | 11/2012 | |
| JP | 2013522611 A | * | 6/2013 | |
| JP | 5771056 | | 7/2015 | |
| KR | 20170091658 A | * | 8/2017 | |
| KR | 2019 0012479 A | | 2/2019 | |
| KR | 20190012479 A | * | 2/2019 | |
| WO | WO 2013/108491 | | 7/2013 | |
| WO | WO-2016048830 A1 | * | 3/2016 | ........ B29D 30/0061 |
| WO | WO-2017109688 A1 | * | 6/2017 | ........ G01M 17/027 |
| WO | WO-2019158440 A1 | * | 8/2019 | ........ G01B 11/162 |

* cited by examiner

SYSTEMS AND METHODS FOR THREE-HUNDRED SIXTY DEGREE INSPECTION OF AN OBJECT

PRIORITY CLAIM

This invention claims the benefit of priority of U.S. Provisional Application Ser. No. 62/970,904, entitled "Systems and Methods for Three-Hundred Sixty Degree Inspection of an Object," filed Feb. 6, 2020, the disclosure of which is hereby incorporated by reference in its entirety.

BACKGROUND

The present embodiments relate generally to systems and methods for inspecting at least three-hundred sixty degrees of an object, such as a tire bead apex.

During the process of applying a rubber apex profile to a tire bead, there are several factors that affect the quality of the finished tire bead apex. Both tire and automobile manufacturers strive for the assurance of a high-quality product, preferably without the requirement to manually inspect every tire bead apex.

In the latest production environment of automated machinery, most tire bead apexes are not handled or monitored by humans throughout the transition from the apex machine to the tire building machine. In such environment, beads apexes with defects will not be discovered until they reach the final tire building machine. This creates costly scrap in addition to lost production time.

Some systems utilize a camera that is disposed above a tire bead apex to inspect a portion of the bead apex. In such instances, the bead apex is generally positioned on a flat conveyor, while the camera is disposed above the bead apex and faces down towards the conveyor. In this manner, the camera is able to detect certain parameters, such as splice, from a single vantage point above the conveyor while facing downward towards the object.

Such systems comprise several drawbacks. As one example, the inspection is limited by the cycle time of the machine and had to be positioned in the middle of the conveyor during the step forward motion. The inspection is also limited by the viewing window of the camera and therefore could only inspect the area of the splice. There is also the possibility that the camera viewing window may not include the splice area because the tire bead apex was not positioned correctly on the conveyor belt, which could give a false positive on the integrity of the splice.

In view of the foregoing, it would be desirable to provide systems and methods for improved inspection of an object, such as a tire bead apex.

SUMMARY

In one embodiment, a system for inspecting an object comprises a first camera for inspecting a first surface of the object, and a second camera for inspecting a second surface of the object. The object may be placed upon a support structure during simultaneous inspection by the first camera and the second camera. At least one roller is arranged to selectively engage the object when the object is placed upon the support structure, wherein the at least one roller is adapted for circumferential rotation relative to the support structure. Rotation of the at least one roller causes a corresponding circumferential rotation of the object relative to the first and second cameras.

In one example, the at least one roller rotates the object at least 360 degrees relative to the location of the first and second cameras, such that the first and second cameras each inspect a different 360 degree surface of the object.

In some examples, the system may comprise at least one gripper having retracted and expanded states, wherein the at least one gripper is configured to engage an inner surface of the object during rotation by the at least one roller. In one embodiment, at least three grippers are configured to engage the inner surface of the object at locations circumferentially spaced apart from one another during rotation by the at least one roller.

The support structure may comprise a table, wherein the first and second cameras inspect the object on opposing sides of the table. The table may comprise at least one opening, wherein the first and second cameras inspect the object on opposing sides of the opening. In one embodiment, the at least one roller is positioned within the opening.

In some embodiments, the table may comprise first and second inspection stations that are spaced apart relative to one another along the table, wherein the first and second cameras inspect a first object at the first inspection station, and then are adapted to move to the second inspection station for inspection of a second object. The first and second cameras may move along a guide rail when moving between the first inspection station and the second inspection station.

In some examples, a robotic device may be adapted to place the object at a predetermined location on the support structure for inspection by the first and second cameras, and further adapted to remove the object from the support structure after inspection is completed. The robotic device may be adapted to place a second object at a second inspection station on the support structure while a first object is inspected at a first inspection station by the first camera and the second camera, and the robotic device is adapted to subsequently place a third object at the first inspection station while the second object is inspected at the second inspection station.

In some non-limiting examples, the object is a tire bead apex.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
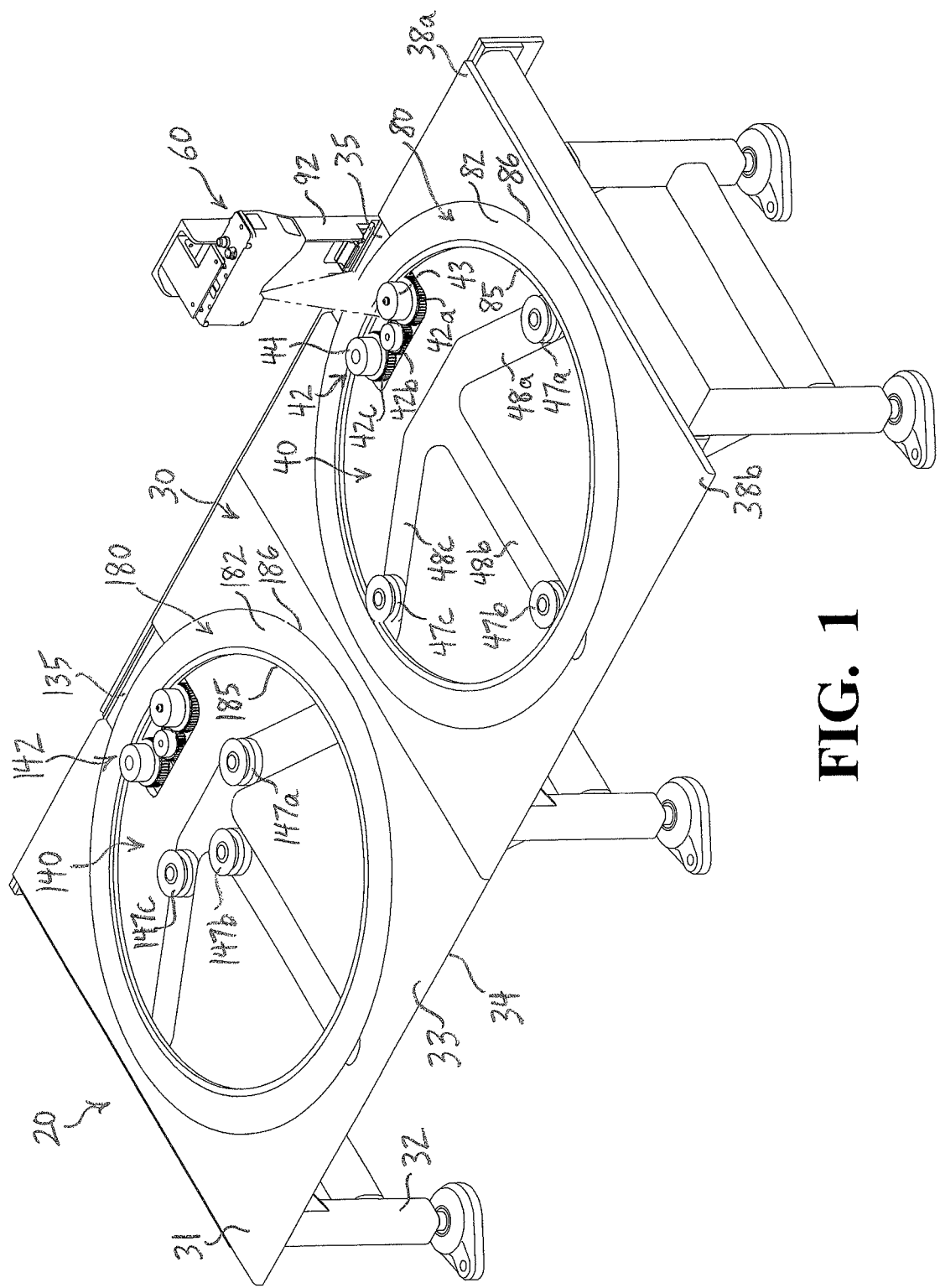
FIG. 1 is an elevated perspective view of a first embodiment of a system for inspecting an object, with first and second cameras placed at a first inspection station.

Referring to FIGS. 1-6, an exemplary system 20 for inspecting an object 80, such as a tire bead apex, is shown. The system 20 generally comprises a support structure 30, a first camera 60 for inspecting a first surface of the object 80, and a second camera 70 for inspecting a second surface of the object 80. The object 80 may be placed upon the support structure 30 during simultaneous inspection by the first camera 60 and the second camera 70, as will be explained in further detail below.

In one embodiment, the support structure 30 comprises a table 31 having a plurality of legs 32, which raise the table 31 a predetermined height from the floor. The table 31 may comprise a first surface 33 and a second surfaces 34, wherein the first camera 60 is positioned to face the first surface 33 of the table 31 and the second camera 70 is positioned to face the second surface 34 of the table 31. In this manner, the first and second cameras 60 and 70 inspect the object 80 with views from opposing sides of the support structure 30, as will be explained in further detail below.

Figure 2:
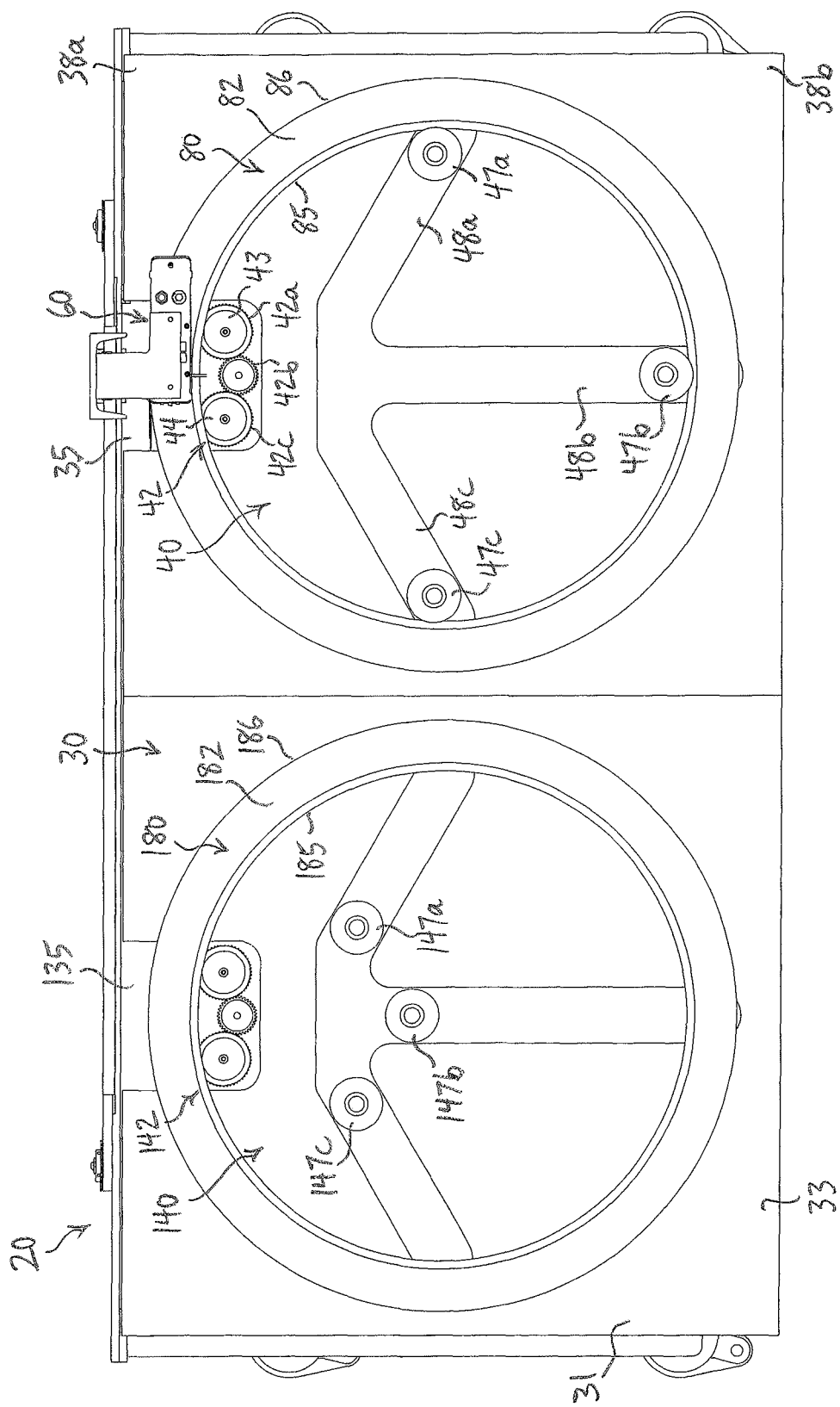
FIG. 2 is a top view of the system of FIG. 1.

The support structure 30 comprises at least one inspection station at which the object 80 is placed during inspection by the first and second cameras 60 and 70. In the embodiment of FIGS. 1-6, a first inspection station 40 is provided at a first location of the table 31, while a second inspection station 140 is provided at a second location of the table 31, where the second location is spaced apart from the first location, as best seen in FIGS. 1-2. It will be appreciated that while two inspection stations 40 and 140 are shown in the embodiment of FIGS. 1-6, the objectives of the present embodiments may be achieved with the support structure 30 having only one inspection station, or with the support structure 30 having three or more inspection stations.

In the embodiment of FIGS. 1-6, where there are first and second inspection stations 40 and 140 that are spaced apart relative to one another along the table 31, the first and second cameras 60 and 70 are configured to inspect a first object 80 at the first inspection station 40, and then are adapted to move to the second inspection station 140 for inspection of a second object 180. A guide rail 90 may be provided to enable a longitudinally-oriented sliding movement of the first and second cameras 60 and 70 from the first inspection station 40 to the second inspection station 140, as explained further below.

In one embodiment, the first and second inspection stations 40 and 140 may comprise generally identical components, where identified by like referenced numbers. For example, an actuation system 42 of the first inspection station 40 may be identical to an actuation system 142 of the second inspection station 140, while three grippers 47a-47c of the first inspection station 40 may be identical to three grippers 147a-147c of the second inspection station 140, and so forth. Similarly, the first object 80 and the second object 180 may comprise generally identical components, where identified by like referenced numbers. For the sake of brevity, a discussion of features of the first inspection station 40 and the first object 80 are provided, while a discussion of corresponding features of the second inspection station 140 and the second object 180 are omitted.

As best seen in FIGS. 1-2, the first station 40 comprises an actuation system 42 that facilitates rotation of the first object 80 in a first direction, e.g., a clockwise direction. In one embodiment, the actuation system 42 comprises three gears 42a-42c, where the gear 42b is generally disposed in-between the gears 42a and 42c, as depicted in FIGS. 1-2. At least one of the gears 42a-42c may be coupled to a driver such as a motor. In one embodiment, the motor is mounted underneath the table 31, although it will be appreciated that the motor may be positioned at other locations. In one embodiment, the motor may drive the first gear 42a, which in turn may cause rotation of the second and third gears 42b and 42c. Alternatively, the motor may drive the second gear 42b, which in turn may cause rotation of the first and third gears 42a and 42c. In either instance, the first and third gears 42a and 42c will rotate in a first direction, e.g., a clockwise direction, while the second gear 42b will rotate in an opposing second direction.

In this example, first and second rollers 43 and 44, which are associated with the first and third gears 42a and 42c, respectively, are provided to selectively engage the first object 80, as depicted in FIGS. 1-2. The first and second rollers 43 and 44 may each be driven in the same circumferential direction when their associated gears 42a and 42c are rotated, as explained above. When the first and second rollers 43 and 44 engage the first object 80, the first object 80 will in turn be rotated in the same direction, e.g., a clockwise direction. However, as will be appreciated, the gears 42a-42c of the actuation system 42 may be adapted to cause a counterclockwise rotation of the first and second rollers 43 and 44, and in turn, the first object 80. Further, it will further be appreciated that greater or fewer than two rollers may be in engagement with the first object 80.

In the embodiment of FIGS. 1-6, the support structure 30 comprises at least one opening 35, which enables the first and second cameras 60 and 70 to inspect the object 80 with views from opposing sides of the support structure 30. In one example, the opening 35 is a cut-out in the table 31 that extends entirely between the first and second surfaces 33 and 34 of the table 31. The opening 35 may be disposed closer to a first side 38a of the support structure 30 than an opposing second side 38b, as depicted in FIGS. 1-2. In some embodiments, the opening 35 may be cut into the first side 38a, while in other embodiments the opening 35 may be spaced apart a distance from the first side 38a.

In one embodiment, the actuation system 42 extends within a portion of the opening 35 in the support structure 30. For example, as best seen in FIGS. 1-2, the gears 42a-42c and the first and second rollers 43 and 44 are generally aligned within the opening 35. The first and second rollers 43 and 44 extend through the opening 35 and engage the first object 80 at a location that is near the first surface 33 of the support structure 30, as depicted in FIGS. 1-2.

Figure 3:
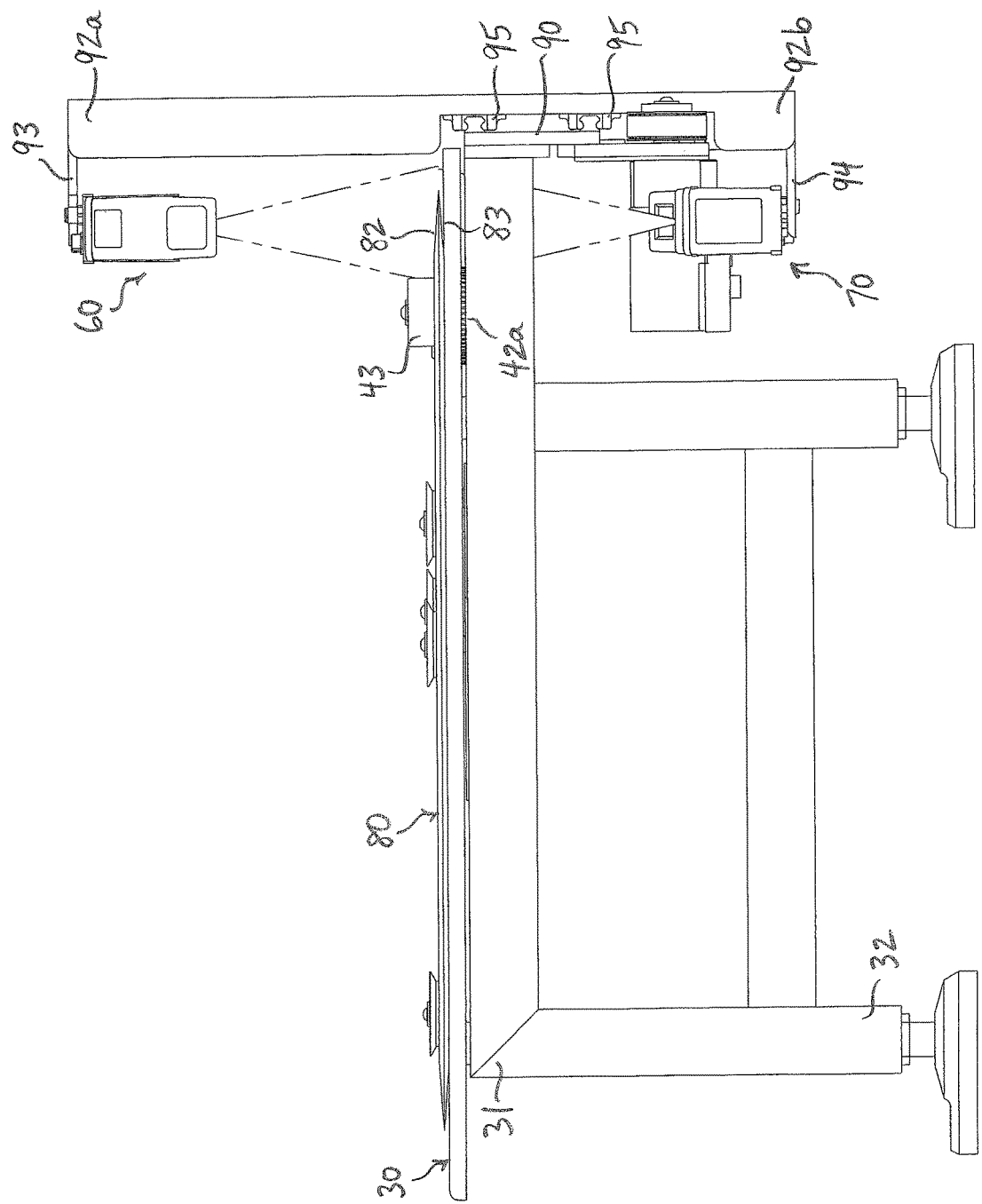
FIG. 3 is an end view of the system of FIG. 1.
Figure 4:
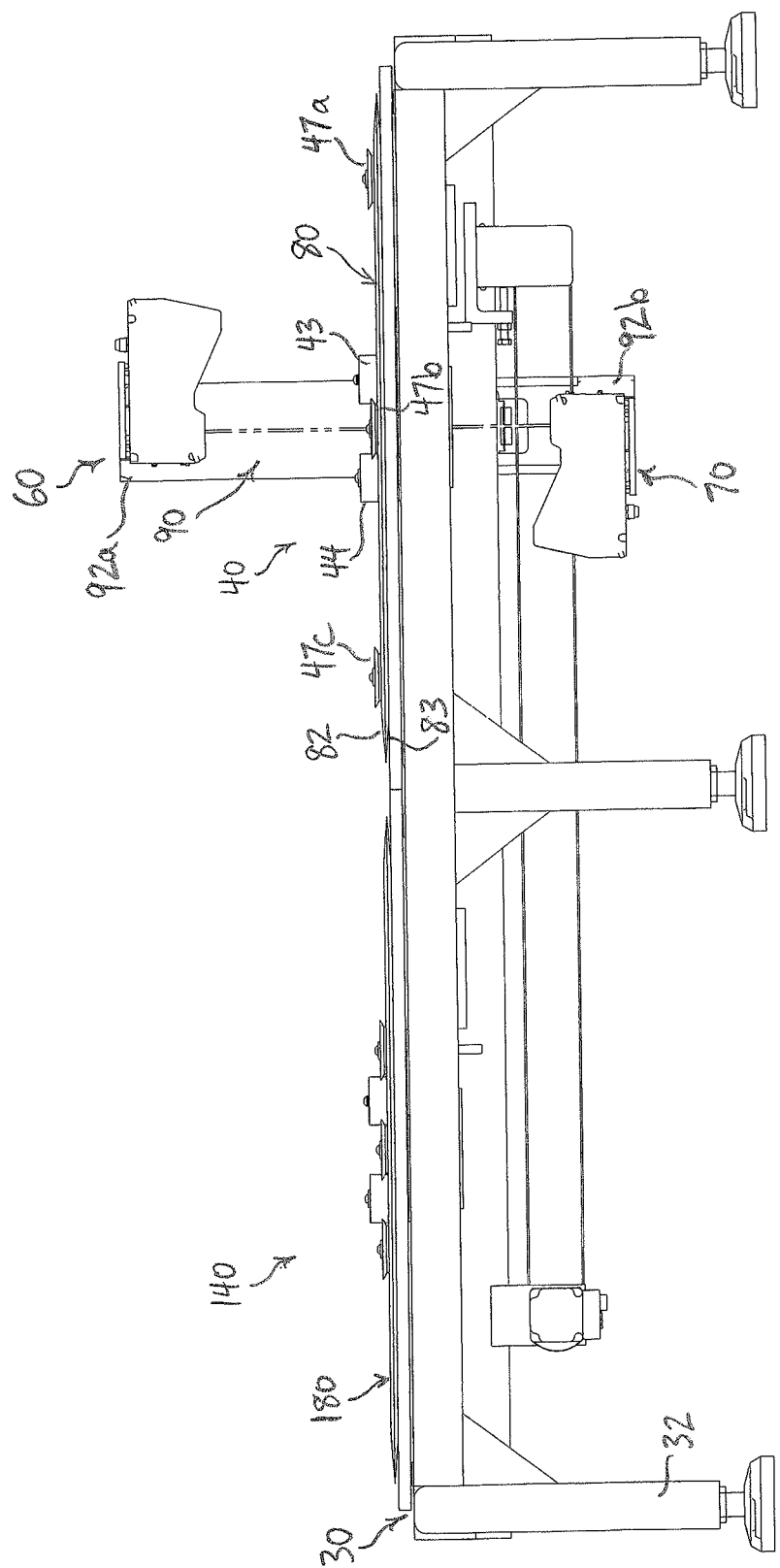
FIG. 4 is a side view of the system of FIG. 1.

In the example where the first object 80 is a tire bead apex, the first object 80 may comprise a generally cylindrical shape having a first surface 82 that faces towards the first camera 60 and a second surface 83 (as best seen in FIG. 3) that faces towards the second camera 70. If the first object 80 is a tire bead apex, it further comprises a circumferentially interior region 85 and a circumferentially exterior region 86, as depicted in FIGS. 1-2. During use, the first and second rollers 43 and 44 engage the circumferentially interior region 85 of the first object 80. As will be explained in further detail below, when the first and second rollers 43 and 44 rotate circumferentially relative to the support structure 30, this causes a corresponding circumferential rotation of the first object 80 relative to the first and second cameras 60 and 70. The first and second rollers 43 and 44 may rotate the first object at least 360 degrees relative to the location of the first and second cameras 60 and 70, such that the first camera 60 inspects an entire 360 degree length of the first surface 82 of the first object 80, while the second camera 70 inspects an entire 360 degree length of the second surface 83 of the first object 80.

The first inspection station 40 may further comprise at least one gripper 47 configured to engage the interior region 85 of the first object 80 during rotation by the actuation system 42. In the example of FIGS. 1-6, three grippers 47a-47c are provided at circumferentially spaced apart locations relative to the first and second rollers 43 and 44 of the actuation system 42, as best seen in FIGS. 1-2.

Figure 5:
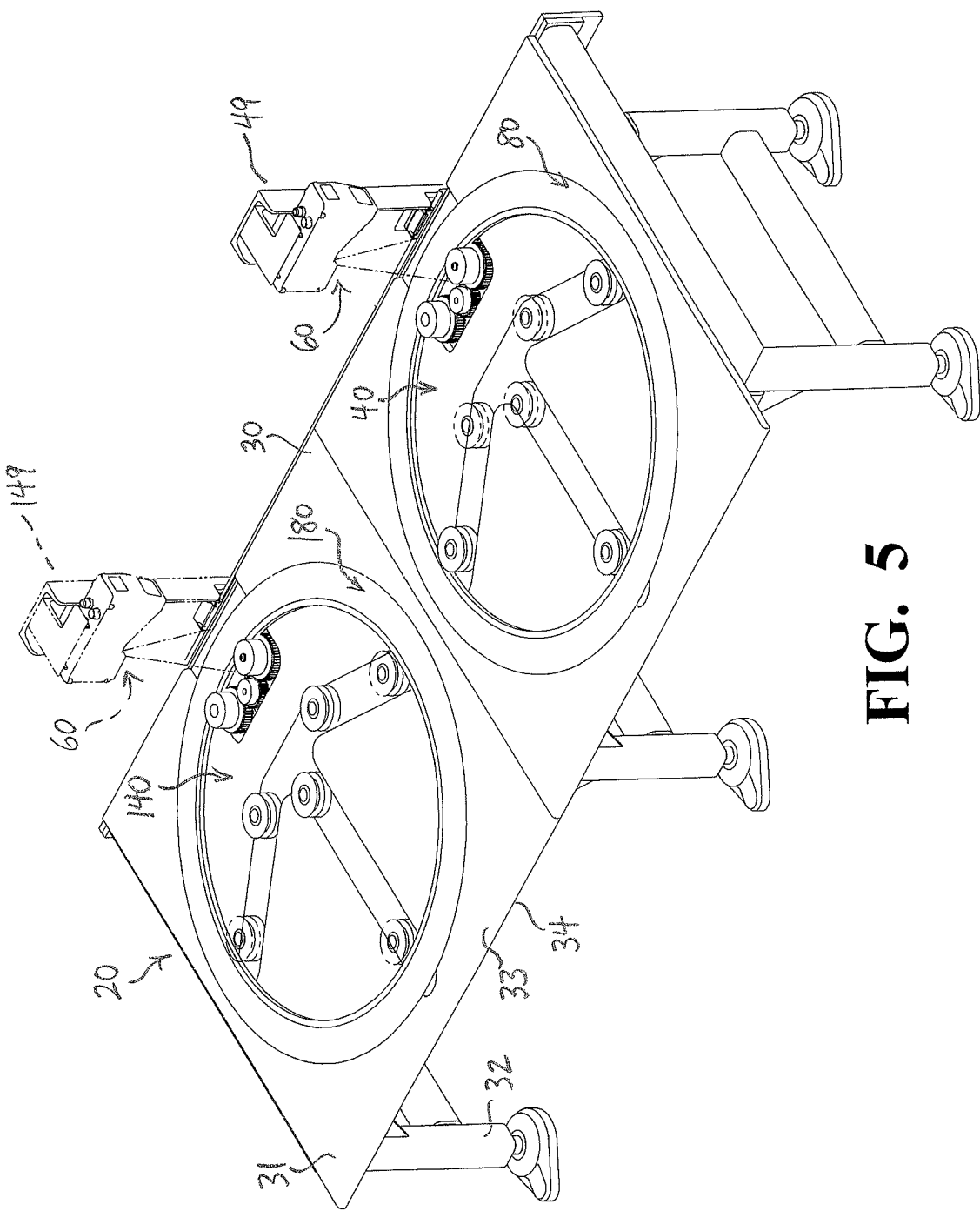
FIG. 5 is an elevated perspective view of the system of FIGS. 1-4, with the first and second cameras depicted at a first inspection system in solid lines, and depicted as being placed at a second inspection station in dashed lines.

The grippers 47a-47c at the first inspection station 40 each comprise a radially retracted state, as best depicted by the dashed lines of FIG. 5, and further each comprise a radially extended state, as best depicted by the solid lines of FIG. 5 and also shown in FIGS. 1-2. In the radially retracted state, each of the grippers 47a-47c is disposed in an inward position such that the first object 80 may be positioned with its interior region 85 surrounding both the grippers 47a-47c and the first and second rollers 43 and 44, preferably without engaging the grippers 47a-47c. Subsequently, the grippers 47a-47c may be actuated to move from the radially retracted state to the radially extended state in which the grippers 47a-47c frictionally engage the interior region 85 of the first object 80, as depicted by the solid lines of FIG. 5, and also shown in FIGS. 1-2. At this time, when the actuation system 42 causes rotational movement of the first object 80 via the first and second rollers 43 and 44, the grippers 47a-47c serve as an outer boundary that helps guide the first object 80 in its circumferential path around the first inspection station 40.

Movement of the grippers 47a-47c from the radially retracted state to the radially extended state may be guided by slots 48a-48c in the support structure 30. In this embodiment, each one of the grippers 47a-47c is positioned within a respective slot 48a-48c, as shown in FIGS. 1-2. The slots 48a-48c may extend from a common, radially inward position in different outward directions towards the peripheral edges of the support structure 30, as depicted in FIGS. 1-2. In this manner, each slot 48a-48c guides a respective gripper 47a-47c from the radially retracted state to the radially extended state.

In one example, grippers 47a-47c operate similar to a center expanding chuck for gripping a bead ring as disclosed by U.S. Patent Application Publication No. 2014/0265400 to Gorham ("the '400 publication"), which is incorporated by reference herein in its entirety. As depicted in FIGS. 1-2, and in a manner similar to the '400 publication, a plurality of chuck arms are adapted to move radially outward to grip an inner surface of annular object such as a bead ring, thereby coupling the first object 80 relative to the actuation system 42 and stabilizing the position of the first object 80 relative to the table 31.

It will be appreciated that while three grippers 47a-47c are shown in the present embodiments, greater or fewer grippers may be used, so long as the at least one gripper provides a suitable guiding path during circumferential movement of the first object 80 relative to the first and second cameras 60 and 70, while the first object 80 is being rotated by the actuation system 42. Moreover, the precise circumferential spacing of the grippers relative to one another may be varied to accomplish such objectives.

As noted above, the first camera 60 is positioned on the side of the first surface 33 of the support structure 30 in order to inspect an entire 360 degree length of the first surface 82 of the first object 80, while the second camera 70 is positioned on the side of the second surface 34 of the support structure to inspect an entire 360 degree length of the second surface 83 of the first object 80. In one embodiment, an elongated support beam 92 may be disposed between the first and second cameras 60 and 70. The first camera 60 may be secured to a first region 92a of the elongated support beam 92 by a bracket 93, while the second camera 70 may be secured to an opposing second region 92b of the elongated support beam 92 by a bracket 94, as best seen in FIG. 3. In this manner, the first and second cameras 60 and 70 may be oriented in a fixed, spaced-apart relationship relative to one another suitable for viewing opposing surfaces of the first object 80.

In accordance with one aspect, the system 20 may be operable to inspect multiple objects in an efficient manner at different inspection stations of the support structure 30. As noted above, the first inspection station 40 may be provided at a first location of the table 31, while the second inspection station 140 may be provided at a second, spaced-apart location of the table 31, as best seen in FIGS. 1-2. In this embodiment, the second object 180 may be positioned at the second inspection station 140 while the first object 80 is inspected at the first inspection station 40 by the first and second cameras 60 and 70, as will be explained in further detail below.

When first and second inspection stations 40 and 140 are provided, the cameras 60 and 70 are guided from a first position 49 adjacent to the first inspection station 40 to a second position 149 adjacent to the second inspection station 140, as depicted in FIG. 5 (noting that the first position 49 of the cameras are in solid lines in FIG. 5, while the second position 149 of the cameras are in dashed lines). In one example, the elongated support beam 92, to which the first and second cameras 60 and 70 are secured, may be moved by one or more bearings 95 along a corresponding guide rail 90 associated with the support structure 30, as depicted in FIG. 3. The guide rail 90 comprises a first region that is positioned adjacent to the first inspection station 40, and further comprises a second region that is positioned adjacent to the second inspection station 140. Accordingly, the elongated support beam 92 may be guided along the track 90 in order to traverse the cameras 60 and 70 from the first position 49 adjacent to the first inspection station 40 to the second position 149 adjacent to the second inspection station 140. Movement of the elongated support beam 92 along the track 90 may be achieved by a motor, which registers the different axial positions of the cameras 60 and 70 at different stages of the procedure, as explained below.

Figure 6:
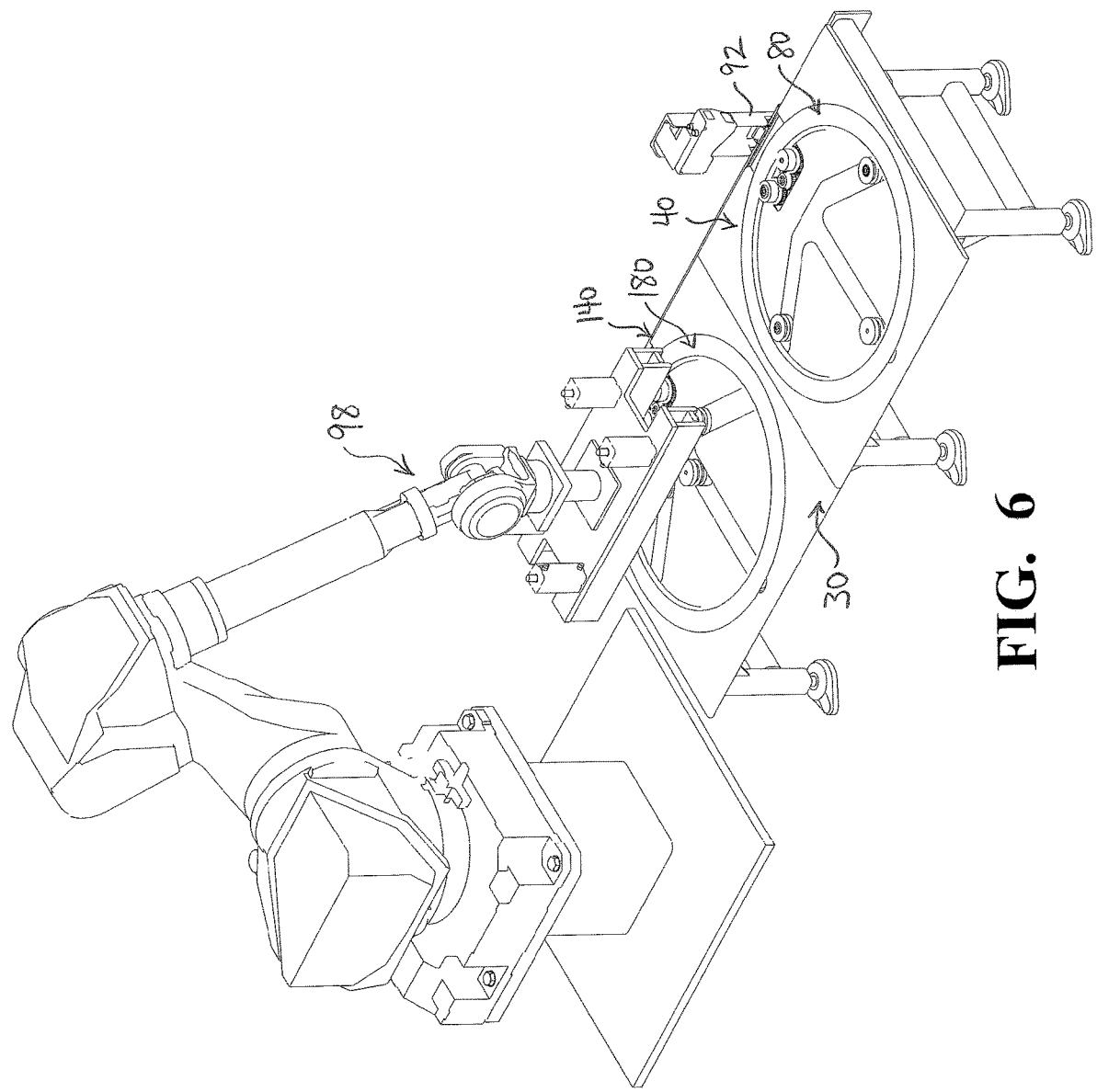
FIG. 6 is an elevated perspective view of the system of FIGS. 1-5 with additional robotic equipment depicted that is suitable for movement of the object.

In an exemplary method of use, after the first object 80 has been partially or fully manufactured at an upstream location, the first object 80 may be guided towards the support structure 30, e.g., via nearby conveyor systems. A robotic device 98, as shown in FIG. 6, may be adapted to place the first object 80 at a predetermined location on the support structure 30, corresponding to the location of the first inspection station 40, as shown in each of FIGS. 1-2, the solid lines of FIG. 5, and where the first object 80 is already placed down in FIG. 6. After placement of the first object 80 on the first surface 31 of the first inspection station 40, the robotic device 98 may move out of the way of the first inspection station 40, e.g., it may move towards a location to receive the second object 180.

Notably, the first object 80 may be placed at the first inspection station 40 when each of the grippers 47a-47c are in the radially retracted state, such that the first object 80 is positioned with its interior region 85 surrounding both the grippers 47a-47c and the first and second rollers 43 and 44.

Subsequently, the grippers 47a-47c may be actuated to move from the radially retracted state to the radially extended state in which the grippers 47a-47c frictionally engage the interior region 85 of the first object 80, as depicted by the solid lines of FIG. 5, and also shown in FIGS. 1-2.

At this time, with the robotic device 98 out of the way of the first inspection system 40, the first and second cameras 60 and 70 are moved adjacent to the first inspection station 40, in a manner such that the first camera 60 can provide imaging of the first surface 82 of the first object 80, while the second camera 70 can provide simultaneous imaging of the second surface 83 of the first object 80. The first and second cameras 60 and 70 may be moved into this position when the elongated support beam 92, to which the first and second cameras 60 and 70 are secured, is moved by the one or more bearings 95 along the guide rail 90 towards the first region of the guide rail 90 that is positioned adjacent to the first inspection station 40. Notably, since the second camera 70 is aligned with the opening 35 in the support structure 30, this facilitates view of the second surface 83 by the second camera 70.

In a next step, the actuation system 42 may be actuated to cause rotational movement of the first object 80 via the first and second rollers 43 and 44. During this process, the grippers 47a-47c serve as an outer boundary that helps guide the first object 80 in its circumferential path around the first inspection station 40.

In a presently preferred embodiment, the first and second rollers 43 and 44 may rotate the first object 80 at least 360 degrees relative to the location of the first and second cameras 60 and 70, such that the first camera 60 inspects an entire 360 degree length of the first surface 82 of the first object 80, while the second camera 70 inspects an entire 360 degree length of the second surface 83 of the first object 80.

The first and second cameras 60 and 70 may capture an array of data about the first object 80 during this inspection process. By way of example and without limitation, when the first object 80 is a tire bead apex, the first and second cameras 60 and 70 may capture data regarding a bare bead, poor bead integrity, a loose bead wire, a foreign object, dogear, apex curl, apex height, splice overlap, splice angle, open splice, splice bulge, heavy stitch, and open stitch.

This data may be analyzed by software in communication with the cameras, which will then decide on whether to approve or reject the first object 80. In one example, line scan cameras may map the surface of the tire bead apex, and these images will then be analyzed in both a two-dimensional and three-dimensional format for such defects.

While the first and second cameras 60 and 70 are imaging the first object, the robotic device 98 may pickup and then place the second object 180 at the second inspection station 140, as generally depicted in FIG. 6. The grippers 147a-147c of the second inspection station 140 may be actuated to move from the radially retracted state to the radially extended state in which the grippers 147a-147c frictionally engage the interior region 185 of the second object 80 to prepare it for viewing by the first and second cameras 60 and 70.

During placement of the second object 180, the inspection process of the first object 80 should be partially or entirely completed. The software will decide on whether to approve or reject the first object 80, and the robotic device 98 may then pass the first object 80 to a downstream location, e.g., as a defective or approved product, according to the disposition determined by the software analysis.

In a next step, the first and second cameras 60 and 70 are moved adjacent to the second inspection station 140, in a manner such that the first camera 60 can provide imaging of the first surface 182 of the second object 180, while the second camera 70 can provide simultaneous imaging of the second surface 183 of the second object 180. The first and second cameras 60 and 70 may be moved into this position when the elongated support beam 92 is moved along the guide rail 90 towards the second region of the guide rail 90 that is positioned adjacent to the second inspection station 140.

The steps regarding rotation, imaging and analysis of the second object 180 are then generally identical to those described above in connection with the first object 80. Notably, during imaging of the second object 180, a third object may be placed at the first inspection station 40. This sequence of alternating between the first and second inspection stations 40 and 140 may be repeated for however many objects are imaged.

Advantageously, using the system 20 of the present embodiments, there is the ability for a full 360 degree viewing of an object from a first surface, and simultaneously a full 360 degree viewing of the object from a second surface directly opposing the first surface. In this manner, the inspection of the object is not limited by the viewing window of a single camera, which could commonly only inspect an area of the splice. In such past designs, there was the possibility that the camera viewing window may not include the splice area because the tire bead apex was not positioned correctly on a conveyor belt, which could give a false positive on the integrity of the splice. The present embodiments overcome the limitations of prior designs by providing a greater viewing window, including a full perimeter of both sides of the object.

As a further advantage, the inspection of the objects 80 and 180 is not limited by the cycle time of any machine. The inspection may occur in a separate stand-alone system 20. This may be contrasted with prior imaging equipment that was be positioned in the middle of a conveyor and imaged an object during the step forward motion.

As yet a further advantage, when first and second inspection stations 40 and 140 are provided, inspections may be done in parallel such that separate positions can alternate the actions of load, unload and inspect. This harmonized overlap provides efficiencies such that a greater number of objects may be inspected in a shorter period of time.

In alternative embodiments, it will be appreciated that although the object has been referenced as a tire bead apex, different objects may be inspected by the system 20 without departing from the spirit of the present embodiments. Further, although a support structure 30 is shown in the form of a horizontal table, it will be appreciated that the support structure 30 alternatively may take a shape other than a horizontal table, so long as it is capable of retaining and rotating the object in the manner described above. Still further, it will be appreciated that the inspection may be performed with the object located in either a horizontal or vertical plane. Moreover, the system 20 can be integrated within an existing manufacturing system, e.g., within a tire bead apex manufacturing system, or could be provided for offline inspection at any location outside of a system.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system for inspecting an object, the system comprising:
   a first camera for inspecting a first surface of the object;
   a second camera for inspecting a second surface of the object;
   a support structure upon which the object is placed during simultaneous inspection by the first camera and the second camera;
   at least one roller arranged to selectively engage the object when the object is placed upon the support structure, wherein the at least one roller is adapted for circumferential rotation relative to the support structure,
   wherein rotation of the at least one roller causes a corresponding circumferential rotation of the object relative to the first and second cameras,
   wherein the support structure comprises a table, wherein the first and second cameras inspect the object on opposing sides of the table,
   wherein the table comprises at least one opening, wherein the first and second cameras inspect the object on opposing sides of the opening, and
   wherein the at least one roller is disposed through the opening in the table.

2. The system of claim 1, wherein the at least one roller rotates the object at least 360 degrees relative to the location of the first and second cameras, such that the first and second cameras each inspect a different 360 degree surface of the object.

3. The system of claim 1, further comprising at least one gripper having retracted and expanded states, wherein the at least one gripper is configured to engage an inner surface of the object during rotation by the at least one roller.

4. The system of claim 3, wherein at least three grippers are configured to engage the inner surface of the object at locations circumferentially spaced apart from one another during rotation by the at least one roller.

5. The system of claim 1, wherein the table comprises first and second inspection stations that are spaced apart relative to one another along the table, wherein the first and second cameras inspect a first object at the first inspection station, and then are adapted to move to the second inspection station for inspection of a second object.

6. The system of claim 5, further comprising a guide rail, wherein the first and second cameras move along the guide rail when moving between the first inspection station and the second inspection station.

7. The system of claim 1, further comprising a robotic device adapted to place the object at a predetermined location on the support structure for inspection by the first and second cameras, and further adapted to remove the object from the support structure after inspection is completed.

8. The system of claim 7, wherein the robotic device is adapted to place a second object at a second inspection station on the support structure while a first object is inspected at a first inspection station by the first camera and the second camera, and wherein the robotic device is adapted to subsequently place a third object at the first inspection station while the second object is inspected at the second inspection station.

9. The system of claim 1, wherein the object is a tire bead apex.

10. A system for inspecting an object, the system comprising:
    a first camera for inspecting a first surface of the object;
    a support structure upon which the object is placed during inspection by the first camera;
    at least one roller arranged to selectively engage the object when the object is placed upon the support structure, wherein the at least one roller is adapted for circumferential rotation relative to the support structure,
    wherein rotation of the at least one roller causes a corresponding circumferential rotation of the object relative to the first camera, and
    wherein the at least one roller rotates the object at least 360 degrees relative to the location of the first camera, such that the first camera inspects a 360 degree surface of the object, and further comprising
    a second camera, wherein the first and second cameras each inspect a different 360 degree surface of the object simultaneously,
    wherein the support structure comprises a table, wherein the first and second cameras inspect the object on opposing sides of the table, and
    wherein the table comprises first and second inspection stations that are spaced apart relative to one another along the table, wherein the first and second cameras inspect a first object at the first inspection station, and then are adapted to move to the second inspection station for inspection of a second object.

11. The system of claim 10, further comprising a robotic device adapted to place the object at a predetermined location on the support structure for inspection by the first and second cameras, and further adapted to remove the object from the support structure after inspection is completed.

12. The system of claim 11, wherein the robotic device is adapted to place a second object at a second inspection station on the support structure while a first object is inspected at a first inspection station by the first camera and the second camera, and wherein the robotic device is adapted to subsequently place a third object at the first inspection station while the second object is inspected at the second inspection station.

13. A system for inspecting an object, the system comprising:
    a first camera for inspecting a first surface of the object;
    a second camera for inspecting a second surface of the object;
    a support structure upon which the object is placed during simultaneous inspection by the first camera and the second camera;
    at least one roller arranged to selectively engage the object when the object is placed upon the support structure, wherein the at least one roller is adapted for circumferential rotation relative to the support structure,
    wherein rotation of the at least one roller causes a corresponding circumferential rotation of the object relative to the first and second cameras,
    wherein the support structure comprises a table, wherein the first and second cameras inspect the object on opposing sides of the table, and
    wherein the table comprises first and second inspection stations that are spaced apart relative to one another along the table, wherein the first and second cameras inspect a first object at the first inspection station, and then are adapted to move to the second inspection station for inspection of a second object.

14. A system for inspecting an object, the system comprising:
a first camera for inspecting a first surface of the object;
a second camera for inspecting a second surface of the object;
a support structure upon which the object is placed during simultaneous inspection by the first camera and the second camera;
at least one roller arranged to selectively engage the object when the object is placed upon the support structure, wherein the at least one roller is adapted for circumferential rotation relative to the support structure,
wherein rotation of the at least one roller causes a corresponding circumferential rotation of the object relative to the first and second cameras,
wherein the support structure comprises a table, wherein the first and second cameras inspect the object on opposite sides of the table,
wherein the table comprises at least one opening, and wherein the at least one roller is disposed through the opening in the table.

15. A system for inspecting an object, the system comprising:
a first camera for inspecting a first surface of the object;
a second camera for inspecting a second surface of the object;
a support structure upon which the object is placed during simultaneous inspection by the first camera and the second camera;
at least one roller arranged to selectively engage the object when the object is placed upon the support structure, wherein the at least one roller is adapted for circumferential rotation relative to the support structure,
wherein rotation of the at least one roller causes a corresponding circumferential rotation of the object relative to the first and second cameras, and
wherein at least one of the first camera or the second camera is coupled to a support that is movable relative to the first inspection station, such that at least one of the first camera or the second camera moves away from an overlap with the first inspection station.

16. The system of claim 15, further comprising a guide rail, wherein at least one of the first camera or the second camera moves along the guide rail relative to the first inspection station.

17. The system of claim 15, wherein at least one of the first camera or the second camera is linearly movable relative to the first inspection station.

18. A system for inspecting an object, the system comprising:
a first camera for inspecting a first surface of the object;
a second camera for inspecting a second surface of the object;
a support structure upon which the object is placed during simultaneous inspection by the first camera and the second camera;
at least one roller arranged to selectively engage the object when the object is placed upon the support structure, wherein the at least one roller is adapted for circumferential rotation relative to the support structure,
wherein rotation of the at least one roller causes a corresponding circumferential rotation of the object relative to the first and second cameras, and
wherein the system comprises first and second inspection stations, and at least one of the first and second cameras is movable between the first inspection station and the second inspection station.

19. A system for inspecting an object, the system comprising:
a first camera for inspecting a first surface of the object;
a second camera for inspecting a second surface of the object;
a support structure upon which the object is placed during simultaneous inspection by the first camera and the second camera;
at least one roller arranged to selectively engage the object when the object is placed upon the support structure, wherein the at least one roller is adapted for circumferential rotation relative to the support structure,
wherein rotation of the at least one roller causes a corresponding circumferential rotation of the object relative to the first and second cameras; and
a table with at least one opening through which the at least one roller is disposed to circumferentially rotate the object relative to the table.

* * * * *